(12) United States Patent
Liu

(10) Patent No.: US 12,173,508 B2
(45) Date of Patent: Dec. 24, 2024

(54) MULTI-LAYERED ROOFING MEMBRANE AND METHOD FOR MANUFACTURING SAME

(71) Applicant: Zhifeng Liu, Foshan (CN)

(72) Inventor: Zhifeng Liu, Foshan (CN)

( * ) Notice: Subject to any disclaimer, the term of this patent is extended or adjusted under 35 U.S.C. 154(b) by 0 days.

(21) Appl. No.: 17/113,081

(22) Filed: Dec. 6, 2020

(65) Prior Publication Data

US 2022/0120085 A1    Apr. 21, 2022

Related U.S. Application Data

(60) Provisional application No. 63/092,979, filed on Oct. 16, 2020.

(51) Int. Cl.

| | |
|---|---|
| *E04D 5/10* | (2006.01) |
| *B32B 7/12* | (2006.01) |
| *B32B 15/08* | (2006.01) |
| *B32B 15/20* | (2006.01) |
| *B32B 27/06* | (2006.01) |
| *B32B 27/36* | (2006.01) |
| *B32B 37/06* | (2006.01) |
| *B32B 37/12* | (2006.01) |
| *B32B 37/18* | (2006.01) |

(52) U.S. Cl.
CPC .................. *E04D 5/10* (2013.01); *B32B 7/12* (2013.01); *B32B 15/08* (2013.01); *B32B 15/20* (2013.01); *B32B 27/06* (2013.01); *B32B 27/36* (2013.01); *B32B 37/06* (2013.01); *B32B 37/12* (2013.01); *B32B 37/185* (2013.01); *B32B 2250/05* (2013.01); *B32B 2255/205* (2013.01); *B32B 2307/416* (2013.01); *B32B 2307/418* (2013.01); *B32B 2307/42* (2013.01); *B32B 2311/20* (2013.01); *B32B 2311/24* (2013.01); *B32B 2367/00* (2013.01); *B32B 2419/06* (2013.01)

(58) Field of Classification Search
CPC .......... E04D 5/10; B32B 15/20; B32B 27/36; B32B 37/06; B32B 37/12; B32B 37/185; B32B 2250/05; B32B 2255/205; B32B 2307/416; B32B 2307/418; B32B 2307/42; B32B 2311/24; B32B 2367/00; B32B 2419/06; B32B 38/0036
See application file for complete search history.

(56) References Cited

U.S. PATENT DOCUMENTS 7,685,785 B2 * 3/2010 Johnson ................ E04D 12/002
 52/409
2021/0285221 A1 * 9/2021 Thagard .................... C09J 7/405

FOREIGN PATENT DOCUMENTS

DE    202015003680 U1 *  7/2015  ........... B32B 27/065
EP       3406817 A1 *  11/2018

* cited by examiner

*Primary Examiner* — John L Goff, II
(74) *Attorney, Agent, or Firm* — Ying-Ting Chen; Law Office of Michael Chen

(57) ABSTRACT

In one aspect, a method for manufacturing a roofing membrane may include steps of (a) providing a PET (Polyethylene terephthalate) layer, (b) applying a first adhesive layer to attach the PET layer to a first photochemistry reaction layer, (c) forming a combination layer by combining the layers in (b) with an aluminum layer, (d) attaching one side of a second photochemistry reaction layer to the combination layer in (c) through a second adhesive layer; and (e) applying a polymer layer on the other side of second photochemistry reaction layer. In one embodiment, the method for manufacturing a roofing membrane may further include a step (f) of heating the membrane formed in step (e) for 48 hours at 60° C.

2 Claims, 3 Drawing Sheets

MULTI-LAYERED ROOFING MEMBRANE AND METHOD FOR MANUFACTURING SAME

CROSS-REFERENCE TO RELATED APPLICATIONS

This application claims priority under 35 U.S.C. § 119 (e) to U.S. Provisional Patent Application Ser. No. 63/092,979, filed on Oct. 16, 2020, the entire contents of which are hereby incorporated by reference.

FIELD OF THE INVENTION

The present invention relates to roofing products and methods of manufacturing the same, and more particularly to a multi-layered roofing membrane configured to be more resistant to heat, corrosion and aging.

BACKGROUND OF THE INVENTION

Within the construction industry, builders and building owners are seeking cost effective and anti-corrosion roofing solutions having good heat insulation as well. In particular, builders and building owners are seeking low maintenance and long-lasting roofing materials that provide protection against environmental hazards, such as rain, snow, hail, wind, heat, and ultraviolet radiation. Rain, snow, hail, and wind tend to cause structural damage to steel roofing membranes. Heat and ultraviolet radiation tend to cause changes in roofing materials, weakening the material and making the material more susceptible to structural damage, such as damage caused by rain, snow, hail, and wind.

In addition, builders and building owners are seeking roofing materials that are tear resistant and puncture resistant. Roofing materials undergo potential tear and puncture hazards during installation and construction. In addition, roofing materials may be exposed to puncture hazards during maintenance of equipment located on the roof, such as HVAC systems. Further, roofing materials may be exposed to puncture hazards resulting from wind-blown debris or hail.

Also, roofing materials are often exposed to extreme heat and solar radiation. Ultraviolet radiation may cause long-term degradation of roofing materials. On a sunny day, roofing materials may experience heat that far exceeds the ambient temperature. For example, a typical black roof may be 70° F. (21° C.) or higher than the ambient temperature on a sunny day. Aging caused by heat or ultraviolet radiation exposure over time may reduce the tear and puncture resistance of the conventional film. In addition, such aging may cause a change in the dimensions of the film, such as shrinking or warping.

In addition, builders and building owners are seeking roofs that maintain their appearance and aesthetics over time. A roofing material that is easy to clean, or resistant to the buildup of dirt will have a better appearance and lower maintenance costs. In particular, an easy way to clean or dirt resistant surface on a light color roof will allow it to maintain its color and high reflectivity for a longer period to time.

Poor resistance to tears, puncture hazards, and aging, may result in films or membranes that leak when exposed to rain, delaminate as a result of heating and freezing processes. When such problems arise, the roofing materials undergo expensive maintenance or complete replacement. A short lifetime of the roofing material or an increased frequency in maintenance results in higher overall costs associated with the roofing system. As such, an improved roofing membrane would be desirable.

SUMMARY OF THE INVENTION

It is an object of the present invention to provide a roofing membrane that is more resistant to heat, corrosion and aging.

It is another object of the present invention to provide a roofing membrane that can reflect 94% of the sunlight to significantly lower the temperature in the interior covered by the roofing material.

It is a further object of the present invention to provide a roofing membrane that can be used for a longer period of time comparing with conventional roofing membranes, and is easy to manufacture and transport to save the handling costs.

In one aspect, a multi-layered roofing membrane may include a polymer layer, a second photochemistry reaction layer, a second adhesive layer, an aluminum layer, a first photochemistry reaction layer, a first adhesive layer, and a PET (Polyethylene terephthalate) layer. In one embodiment, the base is coated with a 55% aluminum-zinc film, and the polymer layer can be a solid-state metal adhesive film to tightly hold the layers thereabove to the base. In another embodiment, the thickness of the polymer layer can be 40 µm.

In a further embodiment, the PET layer is corrosion resistant, meaning the PET layer is both acid and alkali resistant. Furthermore, the PET layer in combination of the first photochemistry reaction layer can reflect and refract most of the sunlight to significantly lower the temperature of the interior structure covered by the roofing membrane in the present invention. In one embodiment, the thickness of the PET layer is 38 µm. It is noted that the PET layer and the first photochemistry reaction layer are glued together by the second adhesive layer.

As stated above, the PET layer in combination of the first photochemistry reaction layer can reflect and refract most of the sunlight. Each of the first and second photochemistry reaction layers is configured to filter the incoming sunlight. More specifically, comparing with conventional roofing membrane, the photochemistry layer in the present invention is configured to filter out most of the sunlight and only let the infrared light go through, and enters the aluminum layer. The aluminum layer, the thickness of which is about 8 µm, is configured to reflect about 99% of the incoming infrared light to lower the temperature of the interior structure covered by the roofing membrane. It is noted that the multi-layered roofing membrane in the present invention can overall reflect/refract about 94% of the sunlight to lower the temperature by 15-18° C.

In another aspect, a method for manufacturing a roofing membrane may include steps of (a) providing a PET (Polyethylene terephthalate) layer, (b) applying a first adhesive layer to attach the PET layer to a first photochemistry reaction layer, (c) forming a combination layer by combining the layers in (b) with an aluminum layer, (d) attaching one side of a second photochemistry reaction layer to the combination layer in (c) through a second adhesive layer; and (e) applying a polymer layer on the other side of second photochemistry reaction layer.

In one embodiment, the step (c) of forming a combination layer by combining the layers in (b) with an aluminum layer may include a step of heating the combination layer for 48 hours at 60° C. In another embodiment, the method for manufacturing a roofing membrane may further include a step (f) of heating the membrane formed in step (e) for 48 hours at 60° C.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
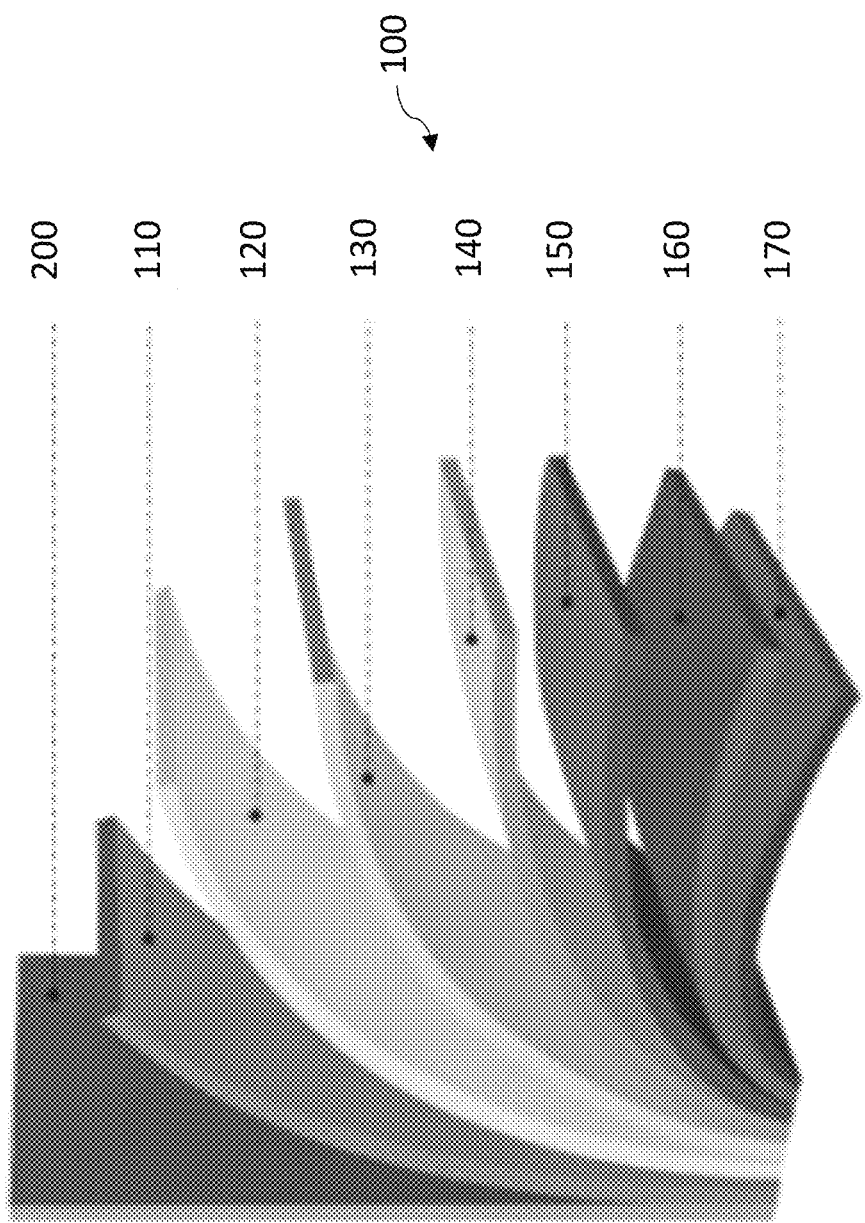
FIG. 1 is a schematic view of the multi-layered roofing membrane in the present invention.

In one aspect, as shown in FIG. 1, a multi-layered roofing membrane 100 may include a polymer layer 110, a second photochemistry reaction layer 120, a second adhesive layer 130, an aluminum layer 140, a first photochemistry reaction layer 150, a first adhesive layer 160, and a PET (Polyethylene terephthalate) layer 170. In one embodiment, a base 200 is coated with a 55% aluminum-zinc film, and the polymer layer 110 can be a solid-state metal adhesive film to tightly hold the layers thereabove (120-170) to the base 200. In another embodiment, the thickness of the polymer layer 110 can be 40 µm.

In a further embodiment, the PET layer 170 is corrosion resistant, meaning the PET layer 170 is both acid and alkali resistant. Furthermore, the PET layer 170 in combination of the first photochemistry reaction layer 150 can reflect and refract most of the sunlight to significantly lower the temperature of the interior structure covered by the roofing membrane 100 in the present invention. In one embodiment, the thickness of the PET layer 170 is 38 µm. It is noted that the PET layer 170 and the first photochemistry reaction layer 150 are glued together by the second adhesive layer 160.

Figure 2B:
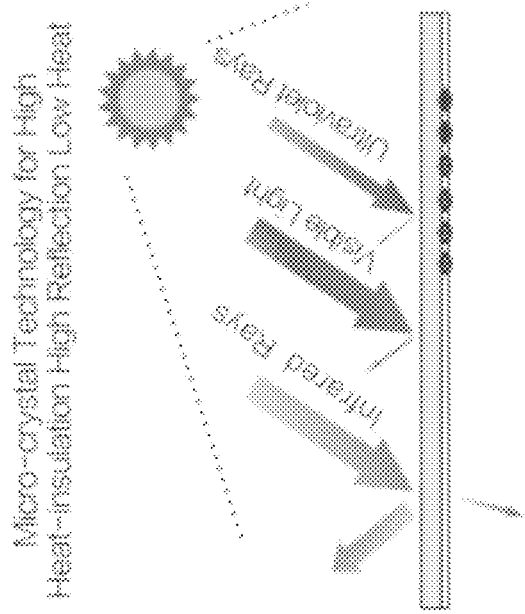
FIGS. 2a and 2b illustrate a comparison about sunlight reflection/refraction between conventional roofing membrane (FIG. 2a) and the present invention (FIG. 2b).
Figure 2A:
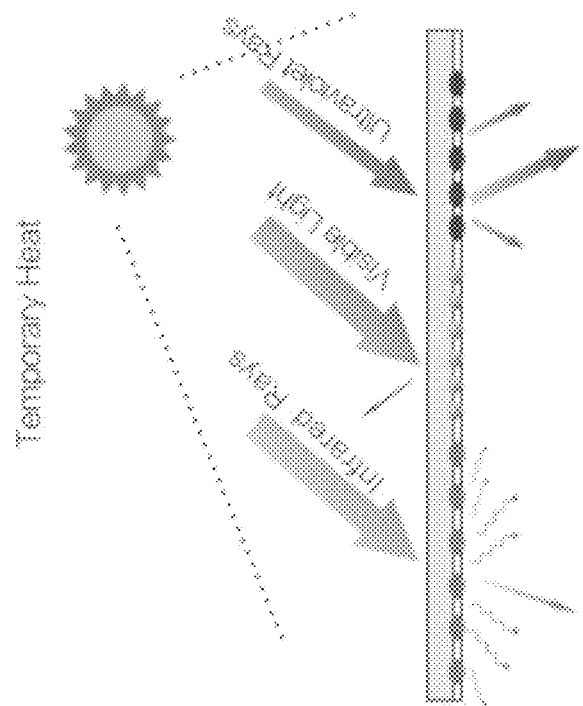

As stated above, the PET layer 170 in combination of the first photochemistry reaction layer 150 can reflect and refract most of the sunlight. Each of the first and second photochemistry reaction layers (150, 120) is configured to filter the incoming sunlight. More specifically, comparing with conventional roofing membrane in FIG. 2a, the photochemistry layer in the present invention is configured to filter out most of the sunlight and only let the infrared light go through, and enters the aluminum layer 140. The aluminum layer 140, the thickness of which is about 8 µm, is configured to reflect about 99% of the incoming infrared light to lower the temperature of the interior structure covered by the roofing membrane 100 as shown in FIG. 2b. It is noted that the multi-layered roofing membrane 100 in the present invention can overall reflect/refract about 94% of the sunlight to lower the temperature by 15-18° C.

Figure 3:
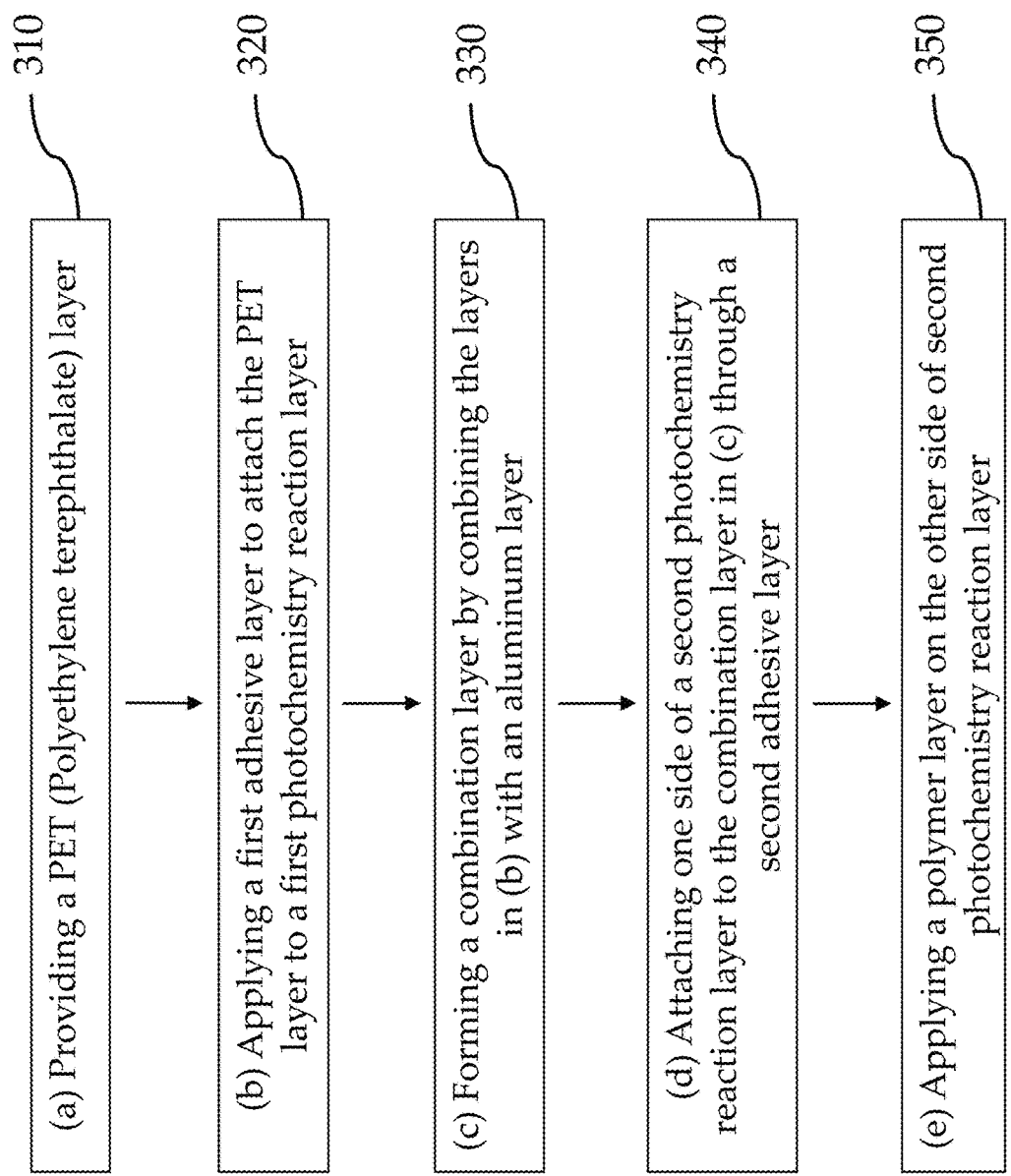
FIG. 3 illustrates a flow diagram of a method for manufacturing the roofing membrane in the present invention.

In another aspect, as shown in FIG. 3, a method for manufacturing a roofing membrane may include steps of (a) providing a PET (Polyethylene terephthalate) layer 310, (b) applying a first adhesive layer to attach the PET layer to a first photochemistry reaction layer 320, (c) forming a combination layer by combining the layers in (b) with an aluminum layer 330, (d) attaching one side of a second photochemistry reaction layer to the combination layer in (c) through a second adhesive layer 340; and (e) applying a polymer layer on the other side of second photochemistry reaction layer 350.

In one embodiment, the step (c) of forming a combination layer by combining the layers in (b) with an aluminum layer may include a step of heating the combination layer for 48 hours at 60° C. In another embodiment, the method for manufacturing a roofing membrane may further include a step (f) of heating the membrane formed in step (e) for 48 hours at 60° C. In a further embodiment, the method for manufacturing a roofing membrane may further include a step (g) of applying the roofing membrane in the present invention to a base material.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A method for manufacturing a multi-layered roofing membrane comprising steps of:
 (a) providing a PET (Polyethylene terephthalate) layer;
 (b) applying a first adhesive layer to attach the PET layer to a first photochemistry reaction layer;

(c) forming a combination layer by combining the layers in (b) with an aluminum layer;
(d) attaching one side of a second photochemistry reaction layer to the combination layer in (c) through a second adhesive layer;
(e) applying a polymer layer on the other side of the second photochemistry reaction layer; and
(f) heating the membrane formed in step (e) for 48 hours at 60° C.

2. The method for manufacturing a multi-layered roofing membrane of claim 1, wherein the step (c) of forming a combination layer by combining the layers in (b) with an aluminum layer may include a step of heating the combination layer for 48 hours at 60° C.

* * * * *